United States Patent
Lee et al.

(10) Patent No.: US 10,770,947 B2
(45) Date of Patent: Sep. 8, 2020

(54) METHOD FOR MANUFACTURING A MOTOR

(71) Applicant: LG ELECTRONICS INC., Seoul (KR)

(72) Inventors: Jangwon Lee, Seoul (KR); Chungook Chong, Seoul (KR); Geunbae Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 15/575,304

(22) PCT Filed: May 17, 2016

(86) PCT No.: PCT/KR2016/005200
§ 371 (c)(1),
(2) Date: Nov. 17, 2017

(87) PCT Pub. No.: WO2016/186427
PCT Pub. Date: Nov. 24, 2016

(65) Prior Publication Data
US 2018/0159402 A1    Jun. 7, 2018

(30) Foreign Application Priority Data
May 18, 2015    (KR) .......................... 10-2015-0069036

(51) Int. Cl.
*H02K 5/15* (2006.01)
*H02K 1/27* (2006.01)
(Continued)

(52) U.S. Cl.
CPC ............. *H02K 5/15* (2013.01); *H02K 1/2726* (2013.01); *H02K 1/2733* (2013.01); *H02K 1/28* (2013.01);
(Continued)

(58) Field of Classification Search
CPC .... H02K 15/03; H02K 15/165; H02K 1/2726; H02K 1/2733; H02K 1/28; H02K 21/16; H02K 5/10
See application file for complete search history.

(56) References Cited

U.S. PATENT DOCUMENTS 4,480,378 A * 11/1984 White ...................... H02K 5/15
228/165
4,603,273 A * 7/1986 McDonald ............... H02K 5/15
310/216.132
(Continued)

FOREIGN PATENT DOCUMENTS

DE        10204034176 A1    2/2006
EP         0 869 600 A1    10/1998
(Continued)

*Primary Examiner* — Minh N Trinh
(74) *Attorney, Agent, or Firm* — Birch, Stewart, Kolasch & Birch, LLP

(57) ABSTRACT

A method of making a motor having a shaft; a pair of end plates arranged to be spaced apart from each other on the shaft; a magnet disposed between the pair of end plates; and a rotor case which surrounds the outer peripheries of the pair of end plates and the outer periphery of the magnet and is made of a synthetic resin material, wherein each of the pair of end plates includes: a flange part, one surface of which faces the magnet; and a cylinder part protruding in a direction opposite to the magnet from the flange part, and the flange part includes a tapered part having an outer diameter which decreases toward the cylinder part.

6 Claims, 6 Drawing Sheets

(51) Int. Cl.
*H02K 15/16* (2006.01)
*H02K 1/28* (2006.01)
*H02K 15/03* (2006.01)
*H02K 7/04* (2006.01)
*H02K 21/16* (2006.01)
*H02K 5/10* (2006.01)

(52) U.S. Cl.
CPC ........... *H02K 15/03* (2013.01); *H02K 15/165* (2013.01); *H02K 5/10* (2013.01); *H02K 7/04* (2013.01); *H02K 21/16* (2013.01)

(56) References Cited

U.S. PATENT DOCUMENTS

| | | | | |
|---|---|---|---|---|
| 4,801,831 | A * | 1/1989 | Lewis | H02K 1/185 |
| | | | | 310/89 |
| 5,035,043 | A * | 7/1991 | Newberg | H02K 1/185 |
| | | | | 29/596 |
| 5,053,664 | A | 10/1991 | Kikuta et al. | |
| 6,247,223 | B1 * | 6/2001 | Keck | F16C 23/045 |
| | | | | 29/596 |
| 8,096,043 | B2 * | 1/2012 | Hargraves | F04B 17/03 |
| | | | | 29/596 |
| 2013/0113324 | A1 | 5/2013 | Shepard et al. | |
| 2018/0159402 | A1 * | 6/2018 | Lee | H02K 1/2733 |

FOREIGN PATENT DOCUMENTS

| | | |
|---|---|---|
| EP | 1 826 884 A1 | 8/2007 |
| JP | 2000-102201 A | 4/2000 |
| KR | 10-2009-0011032 A | 1/2009 |
| KR | 10-2009-0125305 A | 12/2009 |
| KR | 10-2013-0092733 A | 8/2013 |

\* cited by examiner

METHOD FOR MANUFACTURING A MOTOR

CROSS REFERENCE TO RELATED APPLICATIONS

This application is the National Phase of PCT International Application No. PCT/KR2016/005200, filed on May 17, 2016, which claims priority under 35 U.S.C. 119(a) to Patent Application No. 10-2015-0069036, filed in the Republic of Korea on May 18, 2015, all of which are hereby expressly incorporated by reference into the present application.

TECHNICAL FIELD

The present invention relates to a method for manufacturing the same, and more particularly, to a motor provided with a rotor case around an outer circumference a magnet and a method for manufacturing the same.

BACKGROUND ART

A motor is a power-driven machine that rotates by receiving electric power and thereby generates a rotational force to its shaft.

Depending on the types of electric power sources, the motor may be classified into a direct current (DC) motor, a single-phase alternating current (AC) motor, a three-phase alternating current motor and so on.

In these motors, a brushless direct current motor (BLDC motor) is a kind of DC motor, and does not require a brush because a rotor includes a magnet.

The BLDC motor may include a motor housing, a stator disposed in the motor housing, and a rotor located inside the stator.

The BLDC motor generates low noise, and is suitable for high speed rotation. In the case the BLDC motor is applied to a cleaner, an impeller for suctioning air into a dust collecting unit may rotate at a high speed.

It is preferable that the BLDC motor be capable of rotating the impeller with high efficiency.

DISCLOSURE

Technical Problem

The purpose of the present invention is to provide a motor with a low defective rate while preventing breakage of a magnet with a simple structure.

Technical Solution

The present invention provides a motor including: a shaft; a pair of end plates arranged to be spaced apart from each other on the shaft; a magnet disposed between the pair of end plates; and a rotor case surrounding respective outer circumferences of the pair of end plates and an outer circumference of the magnet and being made of a synthetic resin material, wherein each of the pair of end plates includes: a flange portion one surface of which faces the magnet; and a cylinder portion protruding in the opposite direction of the magnet from the flange portion, and wherein the flange portion includes a tapered portion the outer diameter of which becomes smaller as the tapered portion gets closer to the cylinder portion.

The flange portion may further include a magnet contact portion which is connected to the tapered portion, in the state of being in contact with the magnet, and surrounded by the rotor case.

The rotor case may include a center case portion surrounding the magnet contact portion and the magnet; and an end case portions surrounding the cylinder portion and the tapered portion and having a thickness thicker than that of the center case portion.

Part of the cylinder portion and part of the end case portions may be formed with cutting portions.

The synthetic resin material may be a carbon long fiber reinforced plastic.

The present invention provides a method for manufacturing a motor, the method including: an end plate forming step for forming a plurality of end plates and each of which has a cylinder portion protruding from a flange portion, a first assembling step for assembling one of the plurality of end plates to the shaft, a second assembling step for assembling the magnet to the shaft and the end plate assembled with the shaft, a third assembling step for assembling the other of the plurality of end plates to the shaft, and an injection molding step for inserting the end plates and the magnet assembled with the shaft into a mold, and molding a rotor case by injection molding around the outer circumferences of the end plates and the outer circumference the magnet, wherein the end plate forming step includes: forming the flange portion and the cylinder portion protruding from the flange portion and forming, on the flange portion, a tapered portion the outer diameter of which becomes smaller as the tapered portion gets closer to the cylinder portion.

The end plate forming step may include forming the tapered portion by cutting off part of the flange portion closer to the cylinder portion.

The injection molding step may include molding together a center case portion surrounding the magnet, and end case portions surrounding the cylinder portion and the tapered portion.

The injection molding step may include molding the end case portions thicker than the center case portion.

The synthetic resin material may be a carbon long fiber reinforced plastic.

After removing the assembly of the shaft, the end plates, the magnet and the rotor case from the mold; it is possible further to include a balancing adjusting step for cutting off part of the cylinder part and part of the end case part together.

Advantageous Effects

The present invention has advantages that the rotor case can be evenly filled in the vicinity of the cylinder portion, and that breakage of the magnet can be minimized.

MODE FOR INVENTION

Hereinafter, the description of embodiments of the present invention will now be made in detail with reference to the accompanying drawings.

Figure 1:
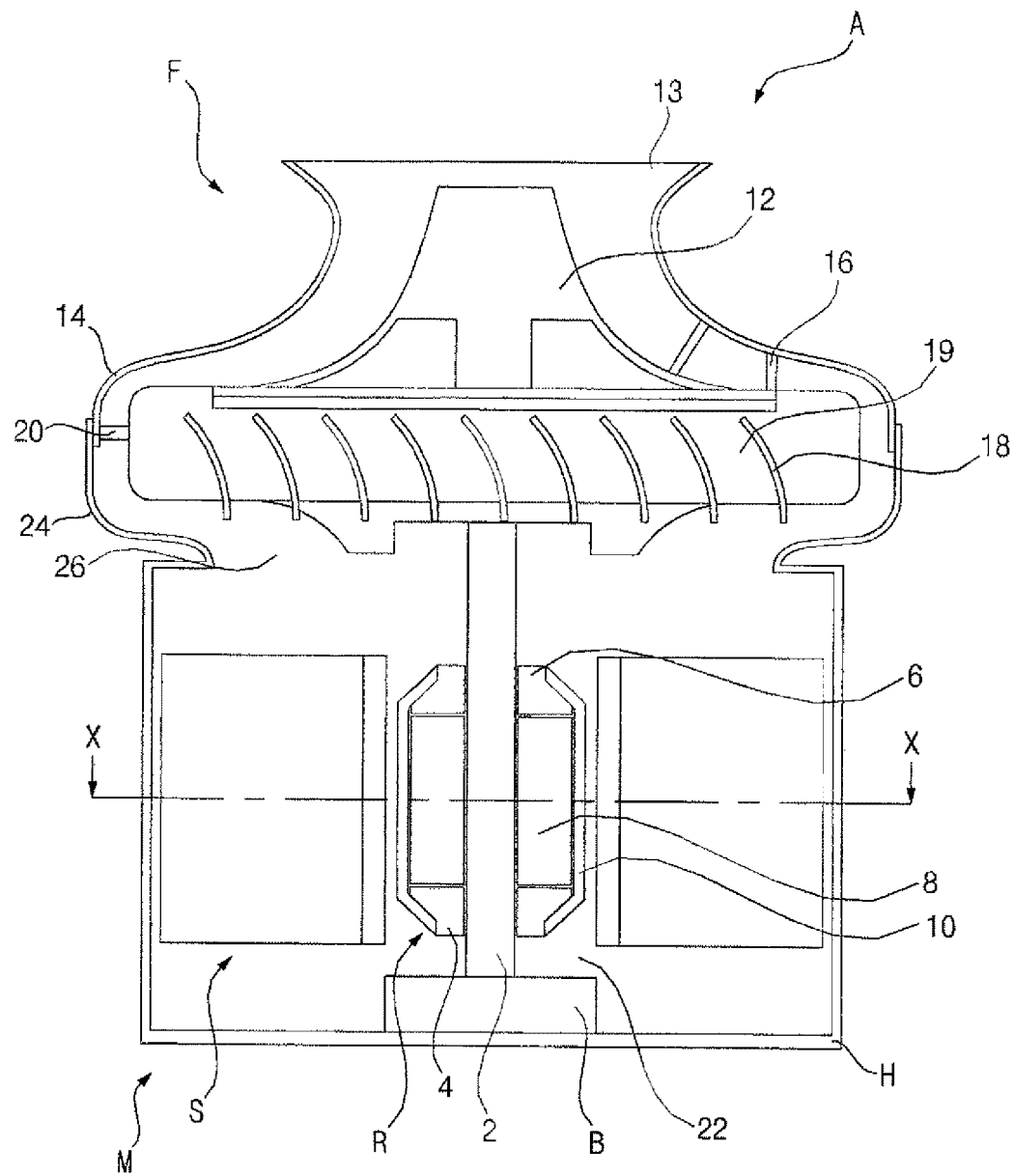
FIG. 1 a sectional view showing the inside of an embodiment of a motor according to the present invention.
Figure 2:
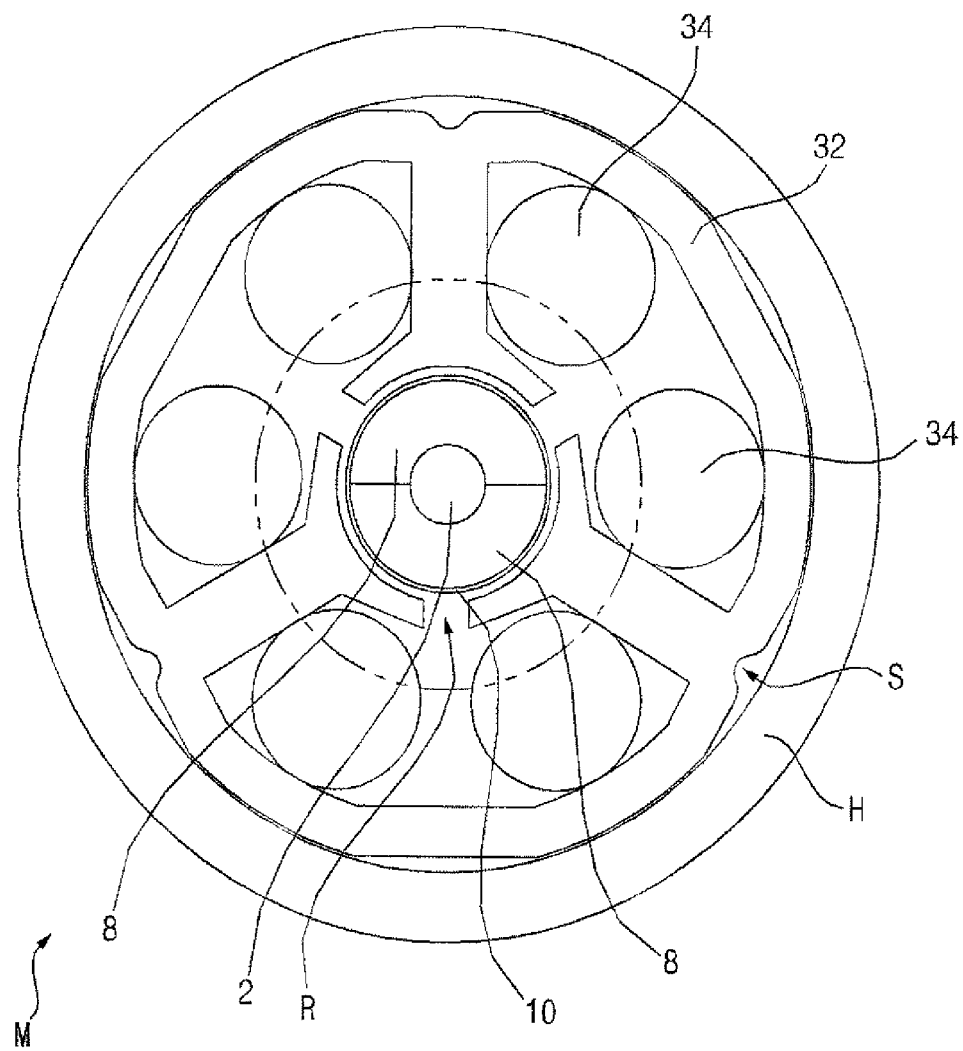
FIG. 2 a sectional view taken along line X-X shown in FIG. 1
Figure 3:
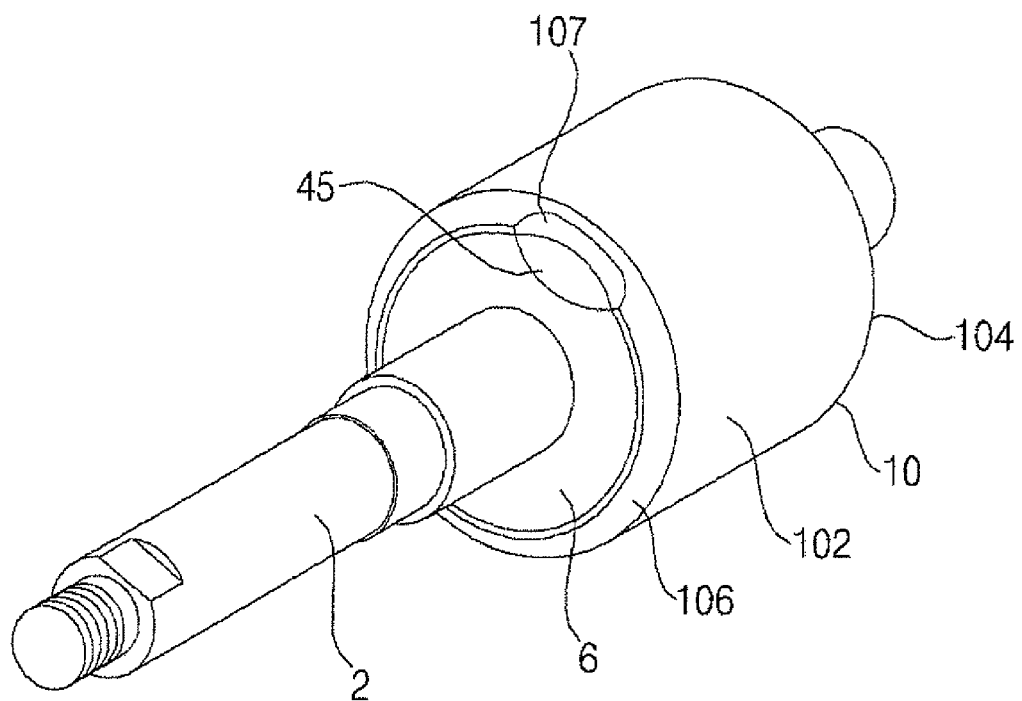
FIG. 3 is a perspective view of a rotor assembly of an embodiment of the motor according to the present invention.
Figure 4:
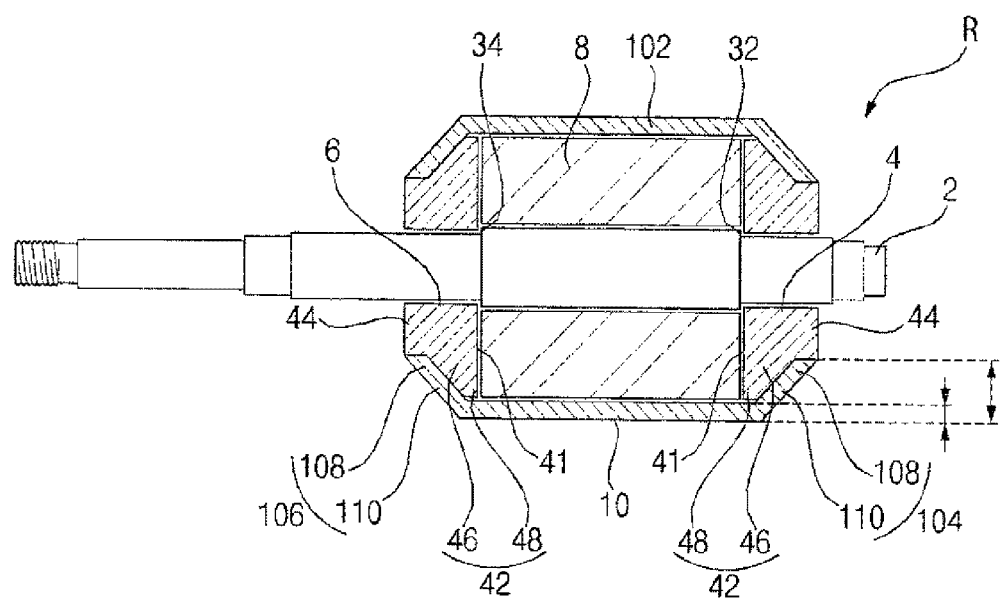
FIG. 4 is an enlarged sectional view of the rotor assembly of the embodiment of the motor according to the present invention.

FIG. 1 a sectional view showing the inside of an embodiment of a motor according to the present invention, FIG. 2 a sectional view taken along line X-X shown in FIG. 1, FIG. 3 is a perspective view of a rotor assembly of an embodiment of the motor according to the present invention, and FIG. 4 is an enlarged sectional view of the rotor assembly of the embodiment of the motor according to the present invention.

As shown FIGS. 1 to 4, a motor M of the present embodiment includes: a shaft 2; a pair of end plates 4 and 6 arranged to be spaced apart from each other on the shaft 2; a magnet 8 disposed between the pair of end plates 4 and 6; and a rotor case 10 which surrounds respective outer circumferences of the pair of end plates 4 and 6 and an outer circumference of the magnet 8, and is made of a synthetic resin material.

The shaft 2, the pair of end plates 4 and 6, the magnet 8, and the rotor case 10 may constitute a rotor assembly R which is rotated together with the motor M when the motor M is driven.

The motor M may be configured as a BLDG motor. In this case, the shaft 2, the pair of end plates 4 and 6, the magnet 8, and the rotor case 10 may constitute a rotor assembly R of the BLDG motor. The motor M may include a motor housing S, a stator S, and the rotor assembly R. The motor M may be installed in the motor housing H, and include a bearing B for rotatably supporting the rotor assembly R.

The motor M may be installed in a cleaner such that the motor can rotate a fan F of the cleaner. The motor M together with the fan F may constitute a fan motor assembly A. The cleaner may include a dust collecting unit in which foreign matter in the air blown by the fan motor assembly A is collected, wherein the dust collecting unit may include a dust collecting net or a cyclone dust collecting container installed upstream of the fan motor assembly A in the air flowing direction.

The fan F includes an impeller 12 and an impeller cover 14 surrounding the impeller 12 and being formed with an air inlet 13.

The impeller may have a plurality of blades being curved in the circumferential direction. When the impeller 12 rotates, air may be sucked into the air inlet 13 and then discharged out in the radial direction of the impeller 12. The impeller 12 may be installed on the shaft 2, and may be rotated together with the shaft 2 when the shaft 2 is rotated by the driving of the motor M.

The impeller cover 14 may be engaged with the motor housing H of the motor M.

The fan F may further include; a diffuser 16 for the pressurizing and transferring of the air discharged out of an outlet of the impeller 12; and guide vanes 18 for guiding the air pressurized and transferred by the diffuser 16 to the inside of the motor.

The diffuser 16 may be disposed around the outer circumference of the impeller 12. The air having passed through the impeller 12 can be pressurized and transferred by the diffuser 16 so that velocity energy can be converted into pressure energy.

The guide vanes 18 may be disposed between the diffuser 16 and the motor M in the air flow direction. The fan F may further include a disk body 19, and the guide vanes 18 may be formed on the outer circumference of the disk body 19. The disk body 19 may have an engaging portion 20 which is engaged with at least one of the impeller cover 14 and the motor housing H.

The motor housing H may form an outer appearance of the motor M. In the motor housing H, a space 22 in which the stator S and the rotor assembly R are accommodated may be formed. The motor housing H may be formed in the form of a cup in section. The motor housing H may have and an open side facing the impeller cover 14. An impeller cover engaging portion 24 which is engaged with the impeller cover 14 may be formed on the motor housing H. The motor housing H may be formed to have an opening 26 into which the air blown from the fan 4 flows. The motor housing H may include an air outlet (not shown) for discharging the air which have cooled the inside of the motor M to the outside.

The stator S may be a stator core 32 wound with a coil 34. That is, the stator S may include a stator core 32 installed in the motor housing H and a coil 34 wound around the state core 32. The coil 34 to be wound may be a three-phase coil.

Hereinafter, the rotor assembly will be described in detail.

The shaft 2 is connected to the central axis of rotation of the impeller 12 shown in FIG. 1. such that the shaft 2 can be rotated together with the pair of end plates 4 and 6, the magnet 8 and the rotor case 10, thereby rotating the impeller 12. The shaft 2 has a first engagement step 32 with which one of the pair of end plates 4 and 6 is engaged and a second engagement step 34 with which the other of the pair of end plates 4 and 6 is engaged.

The pair of end plates 4 and 6 may include cylinders 44 surrounding the shaft 2. The pair of end plates 4 and 6 may be configured to have the same structure except the direction in which each of the cylinders 44 is oriented. The detailed structure of each of the pair of end plates 4 and 6 will be explained by using the same reference numerals. The pair of end plates 4 and 6 may be made of a brass material. That is, the pair of end plates 4 and 6 may be brass end plates.

Each of the pair of end plates 4 and 6 may include a flange portion 42 one surface 41 of which faces the magnet 8, and a cylinder portion 44 protruding in the opposite direction of the magnet 8 from the flange portion 44.

The flange portion 42 is surrounded by the rotor case 10. The one surface 41 of the flange portion 42 is in contact with the magnet 8. The cylinder portion 44 is formed on the other side of the flange portion 42. The flange portion 42 is formed such that its outer diameter varies, and a detailed description thereof will be described later.

The cylinder portion 44 is formed to extend from the flange portion 42. The cylinder portion 44 is in the form of a hollow cylinder with a constant outer diameter. The outer diameter of the cylinder portion 44 is surrounded by the rotor case 10. In the cylinder portion 44, the opposite side surface of the flange portion 42 is not covered with the rotor case 10 but is exposed.

In the case one of the two cylinder portions 44 of the pair of end plates 4 and 6 is directed to the left side of FIG. 4, the other of the two cylinder portion 44 may be directed to the right side of FIG. 4.

The magnet 8 in its center is formed to have a hollow cylinder through which the shaft 2 passes. It is preferable that the magnet 8 be in the form of a cylinder with a constant outer diameter. Opposite circular side surfaces of the magnet 8 are in contact with the one surface of each of the flange portions 42 of the end plates 4 and 6, respectively. The magnet 8 may be disposed between the pair of end plates 4 and 6. Any one of the flange portions 42 of the pair of end plates 4 and 6 and the other of the flange portions 42 of the pair of end plates 4 and 6 are spaced apart in the axial direction of the magnet 8.

The flange portion 42 includes: a magnet contact portion 48 which is in contact with the magnet 8 and in the form of a hollow cylinder with a constant outer diameter; and a tapered portion 46 connected between the magnet contact portion 48 and the cylinder portion 44 such that the outer diameter of the tapered portion 46 becomes smaller as the tapered portion 46 gets closer to the cylinder portion 44.

The magnet contact portion 48 is formed to have one surface 41 which is in contact with one side surface of the magnet 8. The magnet contact portion 48 in its center is formed to have a hollow cylinder through which the shaft 2 passes. The magnet contact portion 48 is surrounded by the rotor case 10. The outer diameter of the magnet contact portion 48 is larger than that of the cylinder portion 44. The one surface of the magnet contact portion 49 is in contact with the magnet 8, and the other surface thereof is connected to the tapered portion 46.

The tapered portion 46 is formed as a taper having oppositely inclined side surfaces which are symmetrical with respect to the center line. The outer diameter of the tapered portion 46 becomes steadily smaller as the tapered portion 46 gets closer to the cylinder portion 44 from the magnet contact portion 48. The tapered portion 46 in its center is formed to have a hollow through which the shaft 2 passes. The tapered portion 46 is surrounded by the rotor case 10.

One surface of the tapered portion 46 is connected to the magnet contact portion 48, and the other surface thereof is connected to the cylinder portion 44. The outer diameter of the one surface of the tapered portion 46 is the same as that of the magnet contact portion 48, and the outer diameter of the other surface thereof is the same as that of the cylinder portion 44. The cylinder portion 44 protrudes from a portion of the tapered portion 46 having the smallest outer diameter.

The tapered portion 46 is a molded portion to prevent a underfilling phenomenon that may occur during the injection molding of the rotor case 10. If the tapered portion 46 is not formed on the plate 42 and the plate 42 and the cylinder portion 44 are bent at a right angle, a sufficient injection pressure is not transferred to the vicinity of the cylinder portion 44 due to the solidification layer region by the rapid temperature drop phenomenon generated during the injection processing, thereby generating an underfilled region in the region close to the cylinder portion 44.

On the other hand, as in the present invention, in the case the plate 42 has the tapered portion 46 the outer diameter of which becomes smaller as the plate 42 is closer to the cylinder portion 44, melted plastic smoothly rides over the tapered portion 46, so a sufficient injection pressure can be transferred, thereby achieving smooth filling in the vicinity of the cylinder.

The magnet 8 may be disposed to surround the outer circumference of the shaft 2 in the form of a ring. A plurality of magnets 8 may be disposed around the shaft 2. Two to twelve magnets 8 may be disposed around the shaft 2. The rotor assembly R may be configured to have a split-type structure in which a plurality of spilt-magnets 8 surround the shaft 2. In the case two magnets are arranged around the periphery of the shaft 2, the motor 6 may include a first magnet surrounding part of the outer circumference of the shaft 2 and a second magnet surrounding the rest of the shaft 2 that is not surrounded by the first magnet. Each of the magnets 8 may be formed in a semicircular shape having a semicircular groove in a portion facing the shaft 2. Also, the plurality of magnets 8 together may surround the outer circumference of the shaft 2. Each of the magnets 8 may be formed in an arc shape with an outer circumference 84 and an inner circumference 85, respectively. The magnets 8 may be bonded to the outer circumferential surface of the shaft 2.

The rotor case 10 may surround the pair of end plates 4 and 6 and the magnet 8 together to protect and fix them. The rotor case 10 can form an outer appearance of the rotor assembly R.

The rotor case 10 may include a center case portion 102 surrounding the magnet contact portion 48 and the magnet 8, and end case portions 104 and 106 surrounding the cylinder portion 44 and the tapered portions 46.

The center case portion 102 is formed in the form of a drum in which both of an outer diameter and an inner diameter thereof are constant. The end case portions 104 and 106 are formed in the form of a bowl in which both of the outer diameter and the inner diameter thereof become reduced as the end case portions 104 and 106 go in the opposite directions. The thickness of the end case portions 104 and 106 may be thicker than that of the center case portion 102.

Each of the end case portions 104 and 106 may include a cylinder portion case 108 surrounding the cylinder portion 44 and a tapered case portion 110 surrounding the tapered portion 46. One side of the tapered case portion 110 is connected to the center case 102 and the other side thereof is connected to the cylinder portion case 108.

Part of the cylinder portions 44 and the end case portions 104 and 106 may be formed with cutting portions 45 and 107. Here, the cutting portions 45 and 107 may be removed portions for balancing the rotor assembly R, and formed as sink portions recessed in part of the rotor assembly R.

After the rotor case 10 has been injection molded, the cutting portions 45 and 107 may be formed by cutting work. It is preferable that the cutting portions 45 and 107 be formed at positions that minimize the influence on the rigidity of the rotor assembly R at the time of high speed rotation thereof, that is at part of the cylinder portion 44 between the flange portion 42 and part of the cylinder portion 44.

The number of the cutting portions 45 and 107 formed in the rotor assembly R may be one or more than one.

The rotor case 10 may be injection molded out of a synthetic resin material. It is preferable that the rotor case 10 be made of a material capable of minimizing breakage of the magnet 8. The synthetic resin material constituting the rotor case 10 may be a carbon long fiber reinforced plastic (PA6+CLFT20%).

Figure 5:
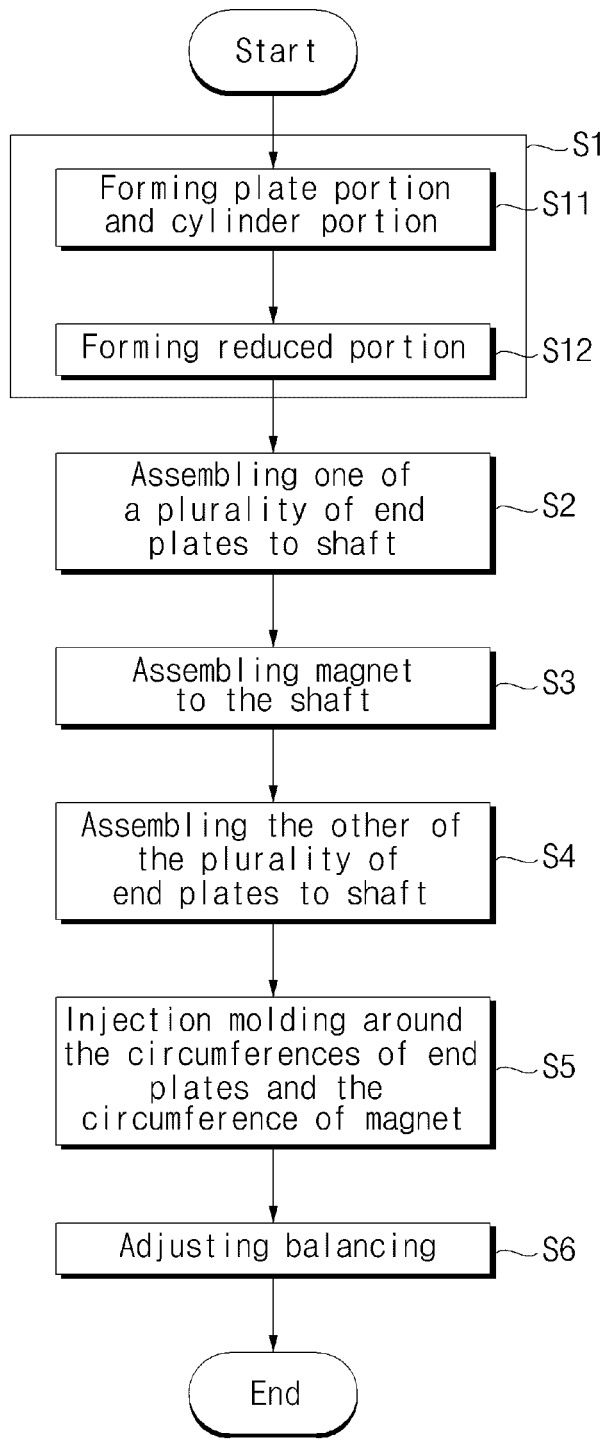
FIG. 5 is a flowchart showing an embodiment of a method for manufacturing the motor according to the present invention.
Figure 6:
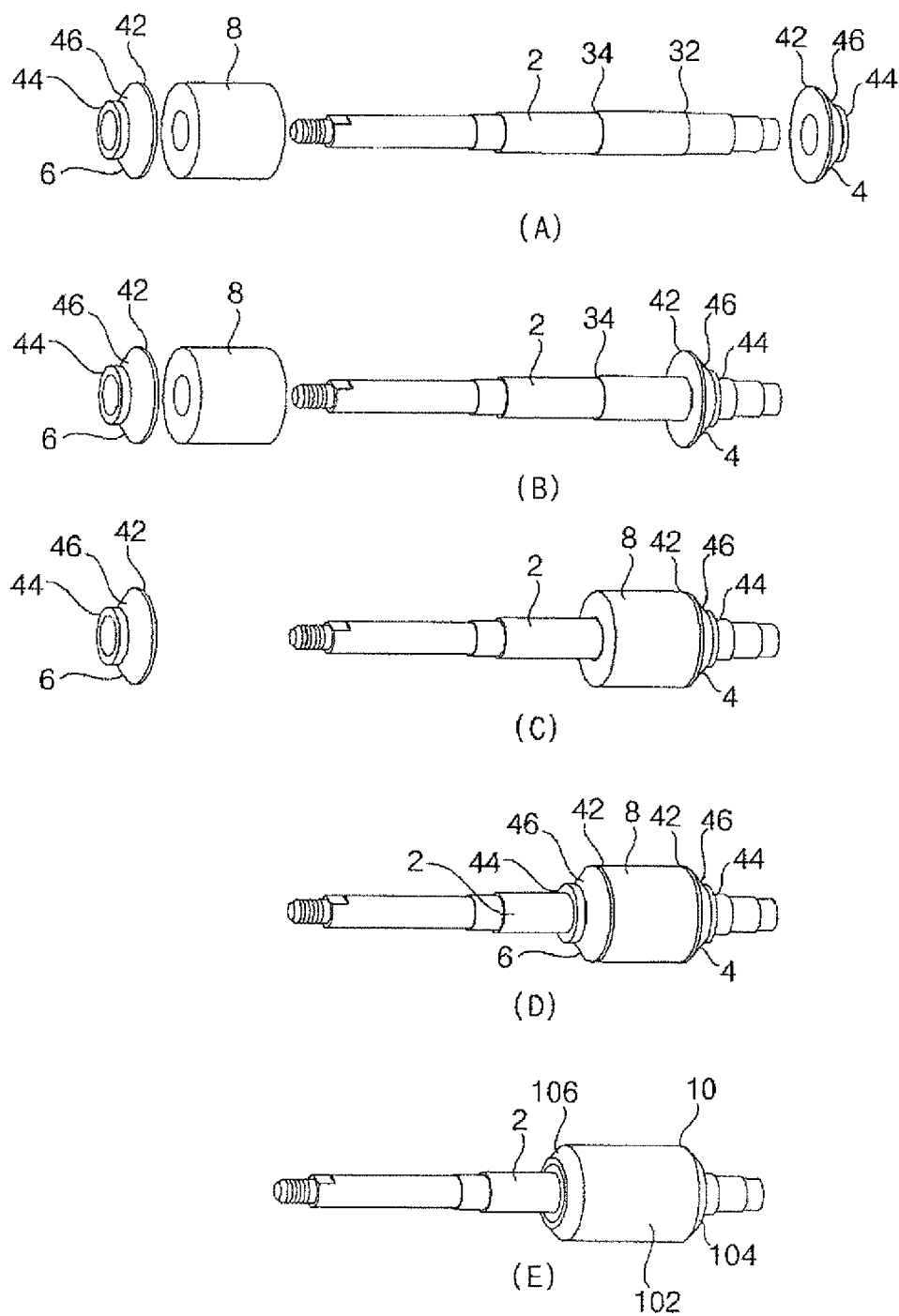
FIG. 6 is a view showing the embodiment of the method for manufacturing the motor according to the present invention.

FIG. 5 is a flowchart showing an embodiment of a method for manufacturing the motor according to the present invention, and FIG. 6 is a view showing the embodiment of the method for manufacturing the motor according to the present invention.

The method for manufacturing the motor may include a rotor assembly manufacturing step for manufacturing a rotor assembly R by integrating a pair of end plates 4 and 6, a magnet 8 and a rotor case 10 with a shaft 2.

The method for manufacturing the motor may include an end plate forming step S1 for forming a plurality of end plates 4 and 6 each of which has a cylinder portion 44 protruding from a flange portion 42.

The end plate forming step S1 may include forming the flange portion 42 and the cylinder portion 44 protruding from the flange portion 42 (step S11) and forming, on the flange portion 42, a tapered portion 46 the outer diameter of which becomes smaller as the tapered portion 42 gets closer to the cylinder portion 44 (S12). The end plate forming step S1 may include forming the tapered portion 46 by cutting off part of the flange portion 42 closer to the cylinder portion 44.

As shown in FIG. 6 (A), the end plates 4 and 6 having the tapered portions 46 may be positioned on opposite sides of the shaft 2.

As shown in FIG. 6 (B), the method for manufacturing the motor may include a first assembling step S2 for assembling one of the plurality of end plates 4 to the shaft 2, as shown in FIG. 6 (C), a second assembling step S3 for assembling the magnet 8 to the shaft 2 and the end plate 4 assembled with the shaft 4, and as shown in FIG. 6 (D), a third assembling step (S4) for assembling the other 6 of the plurality of end plates to the shaft 2.

The method for manufacturing the motor includes an injection molding step S5 for inserting the end plates 4 and 6 and the magnet 8 assembled with the shaft 2 into a mold (not shown), and molding a rotor case 10 by injection molding a synthetic resin material around the outer circumferences of the end plates 4 and 6 and the outer circumference the magnet 8.

As shown in FIG. 6E, the injection molding step S5 may include molding together a center case portion 102 surrounding the magnet 8 and end case portions 104 and 106 surrounding the cylinder portions 44 and the tapered portions 46. The injection molding step S5 may include molding the end case portions 104 and 106 thicker than the center case portion 102. The synthetic resin material used in the injection molding step S5 may be a carbon long fiber reinforced plastic.

The method for manufacturing the motor may further include removing the assembly of the shaft 2, the end plates 4 and 6, the magnet 8 and the rotor case 10 from the mold; and then cutting off part of the cylinder part 44 and part of the end case portions 104 and 106.

Meanwhile, it should be noted that the present invention is not limited to the above described embodiments, and various modifications may be made within the technical scope of the present invention.

INDUSTRIAL APPLICABILITY

The present invention can be applied to a motor rotated at a high speed.

The invention claimed is:

1. A method for manufacturing a motor, the method comprising:
   forming a plurality of end plates, each end plate having a cylinder portion protruding from a flange portion;
   assembling one of the plurality of end plates to a shaft;
   assembling the magnet to the shaft and the end plate assembled with the shaft;
   assembling the other of the plurality of end plates to the shaft; and
   inserting the end plates and the magnet assembled with the shaft into a mold, and molding a rotor case by injection molding around outer circumferences of the end plates and an outer circumference of the magnet,
   wherein the forming a plurality of end plates comprises:
      forming the flange portion and the cylinder portion protruding from the flange portion; and
      forming, on the flange portion, a tapered portion, an outer diameter of the tapered portion becoming smaller as the tapered portion gets closer to the cylinder portion.

2. The method of claim 1, wherein the forming a plurality of end plates further comprises forming the tapered portion by cutting off part of the flange portion closer to the cylinder portion.

3. The method of claim 2, wherein the molding further comprises molding together a center case portion surrounding the magnet, and end case portions surrounding the cylinder portion and the tapered portion.

4. The method of claim 3, wherein the molding further comprises molding the end case portions thicker than the center case portion.

5. The method of claim 3, further comprising adjusting balancing of the cylinder portion by cutting off part of the cylinder portion and part of the end case portions.

6. The method of claim 1, wherein the molding is performed by injecting synthetic resin material comprising a carbon long fiber reinforced plastic.

* * * * *